W. M. SIMMONS.
LATCH OPERATING MECHANISM FOR VEHICLE DOORS.
APPLICATION FILED AUG. 30, 1912.
1,072,048.
Patented Sept. 2, 1913.
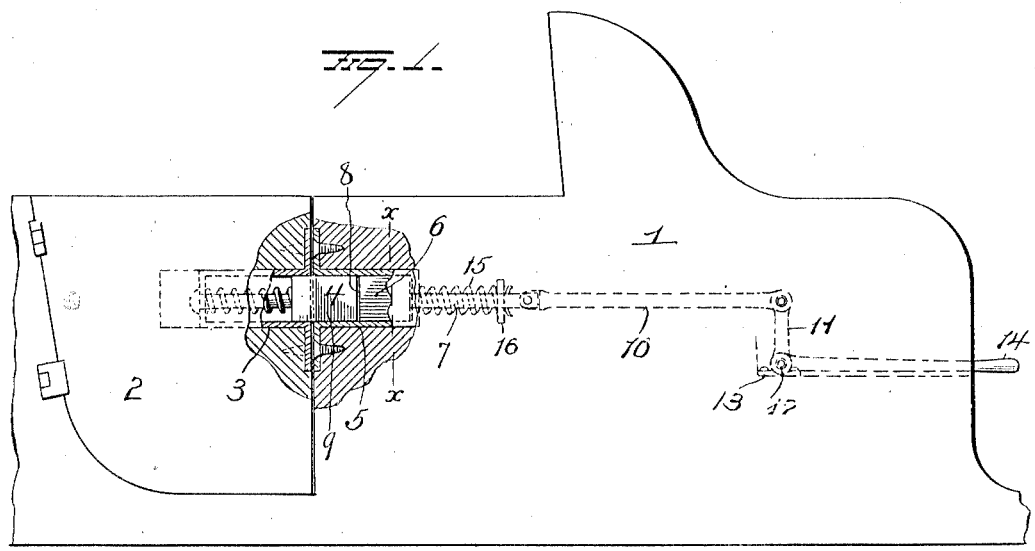
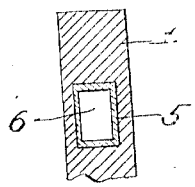
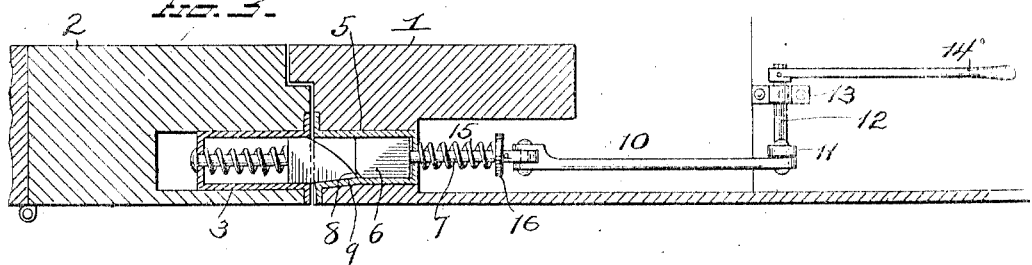
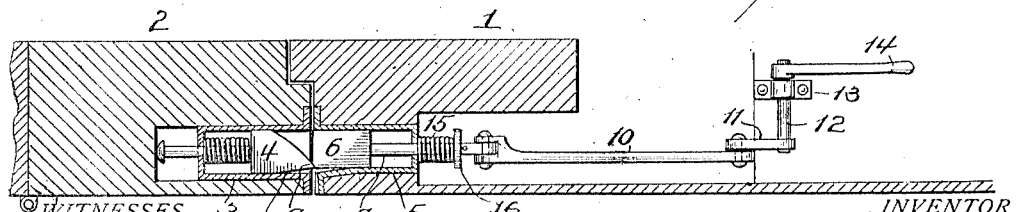
WITNESSES
INVENTOR
W. M. Simmons
By H. A. Seymour
Attorney

UNITED STATES PATENT OFFICE.

WILLIAM M. SIMMONS, OF BURLINGTON, IOWA.

LATCH-OPERATING MECHANISM FOR VEHICLE-DOORS.

1,072,048.  Specification of Letters Patent.  Patented Sept. 2, 1913.

Application filed August 30, 1912. Serial No. 717,984.

*To all whom it may concern:*

Be it known that I, WILLIAM M. SIMMONS, a citizen of the United States, residing at Burlington, in the county of Des Moines and State of Iowa, have invented certain new and useful Improvements in Latch-Operating Mechanism for Vehicle-Doors; and I do hereby declare the following to be a full, clear, and exact description of the invention, such as will enable others skilled in the art to which it appertains to make and use the same.

This invention relates to improvements in latch operating mechanism for vehicle doors, the object of the invention being to provide simple and efficient means for enabling the chauffeur of an automobile to release the door latch by manipulating a lever located adjacent to the front or driver's seat of the car.

With this and other objects in view, the invention consists in certain novel features of construction and combinations of parts as hereinafter set forth and pointed out in the claim.

In the accompanying drawings, Figure 1 is an elevation partly in section, of a portion of an automobile showing an embodiment of my invention; Fig. 2 is a transverse sectional view; Fig. 3 is a horizontal sectional view showing the normal "latched" positions; and Fig. 4 is a view similar to Fig. 3 showing the "unlatched" positions of the parts.

1 represents portions of an automobile body and 2 the hinged door,—the latter being provided with a mortised casing or guide 3 for the accommodation of the latch 4. A casing 5 is countersunk or mortised into the wall of the car in line with guide or casing 3 (when the door is closed) and constitutes a keeper for the latch, which latter is of the usual beveled type. A plunger 6 is movable in the casing 5 and is provided with a stem 7 freely movable through an opening in the forward end of said casing. The plunger 6 is made with a small notch 8 to insure engagement of said plunger with the free end of the latch, and the lower wall of the casing 5 is beveled, as at 9, to be engaged by the latch for insuring the tight closing of the door.

A rod or pitman 10 is pivotally secured to the stem 7 of the plunger 6 and the forward end of this rod or pitman is connected with an arm 11 at the lower end of a short horizontal shaft 12. The shaft 12 is mounted in a suitable bearing 13 adjacent to the chauffeur's seat and is provided at one end with an operating lever 14. A spring 15 encircles the stem 7 of plunger 6 and bears at one end against the casing 5,—the other end of said spring bearing against a disk or abutment 16 on said stem. The spring 15 tends normally to move the plunger 6 to the forward end of the casing 5 to enable the latch to freely enter said casing when the door is closed.

It is apparent that if the lever 14 be moved from the position shown in Fig. 3 to the position shown in Fig. 4, the plunger 6 will be moved rearwardly and, engaging the latch, will move the latter free of the open end of the casing or keeper 5 so as to permit the door to be opened. As soon as the operator releases the lever 14, the parts will be caused, by the operation of the spring 15 to assume the normal positions shown in Fig. 3.

Various slight changes might be made in the details of construction of my invention without departing from the spirit thereof or limiting its scope and hence I do not wish to restrict myself to the precise details herein set forth.

Having fully described my invention, what I claim as new and desire to secure by Letters-Patent, is:—

The combination with a vehicle body, a door therefor, and a latch carried by the door, of a tubular keeper in the wall of the vehicle body and having a beveled wall at its free end, a plunger in said tubular keeper, a stem fixed to said plunger and projecting through the inner end of said keeper, a spring on said stem normally retracting the keeper, a rock shaft adjacent to the front of the vehicle body, a crank arm projecting from said rock shaft, a rod connecting said crank arm with the stem of the plunger, and an operating lever also secured to said rock shaft.

In testimony whereof, I have signed this specification in the presence of two subscribing witnesses.

WILLIAM M. SIMMONS.

Witnesses:
 CHAS. C. CLARK,
 JNO. J. SEERLEY.